United States Patent
Memon et al.

(10) Patent No.: US 11,227,510 B2
(45) Date of Patent: Jan. 18, 2022

(54) OPTIMAL TACTILE DISPLAY

(71) Applicants: Abdullah Memon, Hyderabad (PK);
Attiya Baqai, Hyderabad (PK);
Mudassir Kazmi, Mirpurkhas (PK)

(72) Inventors: Abdullah Memon, Hyderabad (PK);
Attiya Baqai, Hyderabad (PK);
Mudassir Kazmi, Mirpurkhas (PK)

(73) Assignee: MEHRAN UNIVERSITY OF ENGINEERING AND TECHNOLOGY, JAMSHORO, PAKISTAN, Jamshoro (PK)

( * ) Notice: Subject to any disclaimer, the term of this patent is extended or adjusted under 35 U.S.C. 154(b) by 488 days.

(21) Appl. No.: 16/355,713

(22) Filed: Mar. 16, 2019

(65) Prior Publication Data
US 2019/0347961 A1    Nov. 14, 2019

(51) Int. Cl.
*G09B 25/04* (2006.01)

(52) U.S. Cl.
CPC ............. *G09B 25/04* (2013.01)

(58) Field of Classification Search
CPC ..................................... G09B 25/04
USPC ................................. 434/150
See application file for complete search history.

*Primary Examiner* — Kesha Frisby
(74) *Attorney, Agent, or Firm* — Bajwa IP Law Firm; Haris Zaheer Bajwa

(57) ABSTRACT

A method and structure for for displaying an optimal tactile display, comprising transforming a CAD image into physical dimensions and creating an optimal tactile display reflective of the physical dimensions utilizing instructions from one or more microcontrollers. The optimal tactile display comprises an array display surface comprising a collection of controlled pins, a quantity of controlled pins propositional to a size of the physical dimensions, wherein each pin assembly of the controlled pins configured to be extended pins based upon the size of the physical dimensions, a plurality of planetary motors, each of the planetary motors associated with the controlled pins and configured to move the plurality of pins, a control unit to monitor the extension of the plurality of pins, and respective linear actuators configured to drive a respective motor shaft connected to a respective lead screw, each respective lead screw placed inside of each of respective threaded circular cross-section stoke tube.

11 Claims, 6 Drawing Sheets

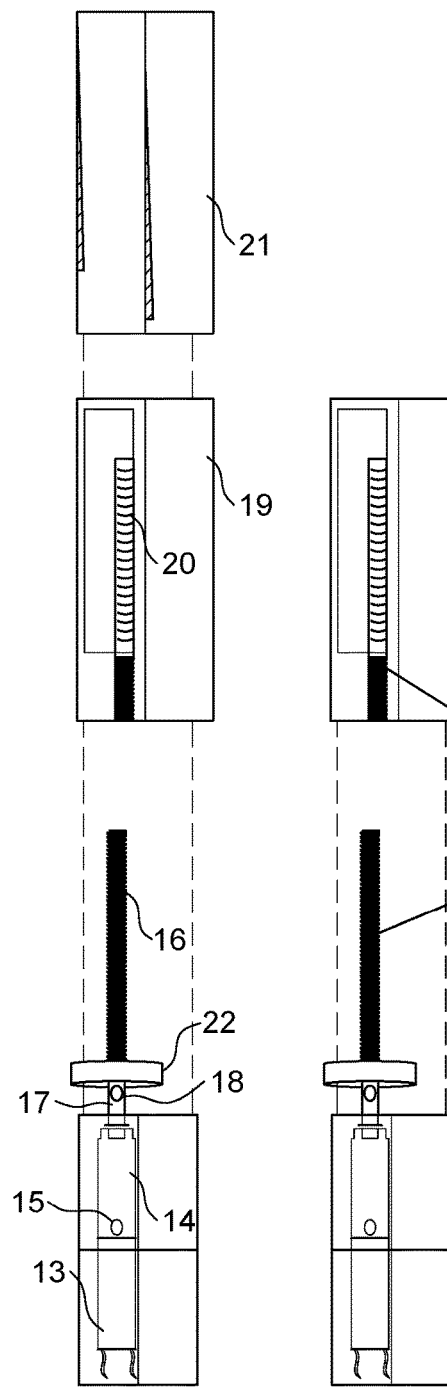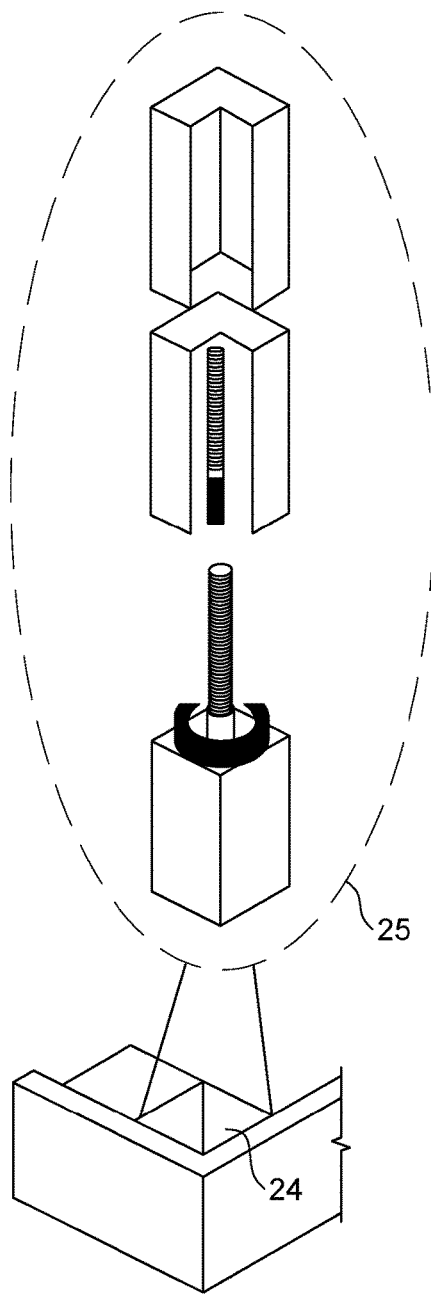
Fig. 2B  Fig. 2C  Fig. 2D

OPTIMAL TACTILE DISPLAY

PRIORITY

This application claims the benefit of priority from Pakistan Patent Application No. 163/2018 (entitled "Optimal Tactile Display"), filed Mar. 16, 2018, which is hereby incorporated herein by reference in its entirety.

TECHNICAL FIELD

This invention relates to a system and method to optimally visualize the digital data physically. 3D rendering of an image using image acquisition tools and in particular to form architecture model of construction sites using actuators providing easy and swift actuating mechanism to render the physical content effectively.

BACKGROUND

The present disclosure finds its genesis in presenting information in three-dimensional form. In the graphics world, 3D computer graphics are three-dimensional illustrations of geometric data that is utilized to render a 2D image in order to visualize it rather effectively. The process is performed using special CAD crafting software that explores all the 3D interpretation of a 2D image by extruding it into three dimensions. Moreover, the process of 3D rendering is used to visualize the 3D image on a 2D display.

The three-dimensional (3D) technology, after the invention of a tangible user interface (TUI) and radical atoms has been a popular area of information technology and more specifically to physical rendering. Much of the research in this field has to produce hardware and software products which tend to provide more natural human-computer interfaces and physical visualization of graphics. These inventions entirely change the sense of visualization.

Conventionally, the only way to visualize 2D graphics is on a 2D static screen. The 2D image is a graphical generation of digital data using certain techniques and then technology evolved and the invention of virtual reality (VR) took place; Virtual reality is a computer technology in which a user wears a VR headset and experiences 3D visualization of graphics or images. VR drawbacks (such as objects in real spaces) led the invention of augmented reality (AR) which augmented the 3D graphics in the real-world environment but the fact is; these animations are based on ghostly pixels and these pixels can't be touched physically.

Past research on 3D displays was focused on just rendering the 3D content to overcome the limitation of single-point haptic display. Conventional systems are limited because they are very bulky in size and require heaving processing power to operate. Actuating mechanisms used in these devices consumes a lot of power and thus require a cooling system to overcome the burst of heat. These actuators further possess relatively larger width which ultimately renders low-resolution output.

As such, it would be beneficial to provide a system and method which is able to display 3D information in physical structure efficiently and accurately.

SUMMARY

An object of the invention is to provide new and improved methods and systems for generating a physical display based on CAD foes. The following presents a simplified summary of exemplary embodiments of the present disclosure in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter. In an exemplary embodiment, a method for displaying an optimal tactile display, comprising obtaining a computer-aided design and drafting (CAD) image transforming the CAD image into physical dimensions, and creating an optimal tactile display reflective of the physical dimensions utilizing instructions from one or more microcontrollers.

In an exemplary embodiment, an optimal tactile display comprising an array display surface comprising a collection of controlled pins, a quantity of controlled pins propositional to a size of the physical dimensions, wherein each pin assembly of the controlled pins configured to be extended pins based upon the size of the physical dimensions. In an exemplary embodiment, the optimal tactile display further comprising a plurality of planetary motors, each of the planetary motors associated with the controlled pins and configured to move the plurality of pins, a control unit to monitor the extension of the plurality of pins, and respective linear actuators configured to drive a respective motor shaft connected to a respective lead screw, each respective lead screw placed inside of each of respective threaded circular cross-section stoke 19 tube.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which:

FIGS. 2B-D show exemplary embodiments of a linear actuator, consistent with one or more exemplary embodiments in the present disclosure, FIG. 3 displays an exemplary scenario of actuation of the pins, consistent with exemplary embodiment of the present disclosure.

DETAILED DESCRIPTION

Figure 1:
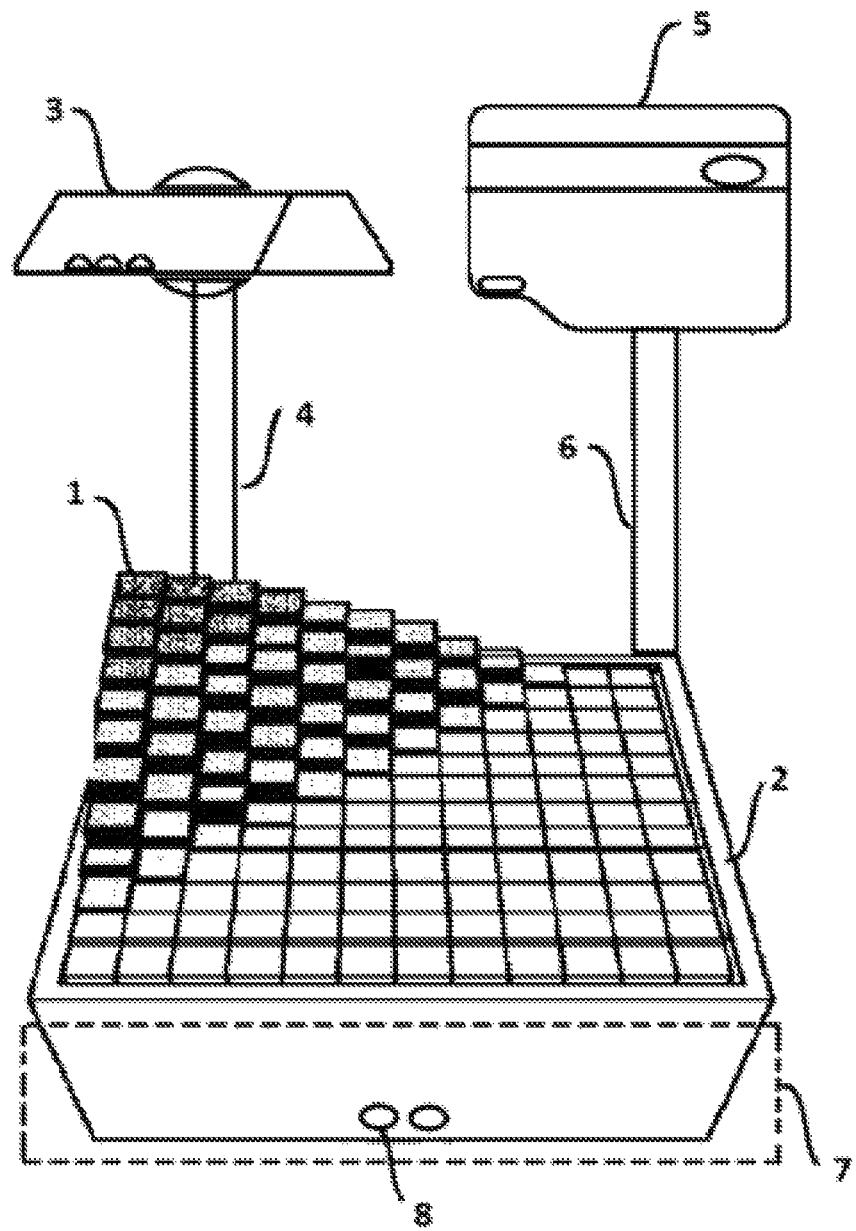
FIG. 1 illustrates an optimal tactile display, consistent with one or more exemplary embodiments of the present disclosure.

The novel features which are believed to be characteristic of the present invention, as to its structure, organization, use and method of operation, together with further objectives and advantages thereof, will be better understood from the following discussion.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. The figures discussed below provide details regarding exemplary systems that may be used to implement the disclosed functions.

Some concepts are described in form of steps of a process or method. In this form, certain operations are described as being performed in a certain order. Such implementations are exemplary and non-limiting. Certain operations described herein can be grouped together and performed in a single operation, certain operations can be broken apart into plural component operations, and certain operations can be performed in an order that differs from that which is described herein, including a parallel manner of performing the operations. The operations can be implemented by software, hardware, firmware, manual processing, and the like, or any combination of these implementations. As used herein, hardware may include computer systems, discrete logic components, such as application specific integrated circuits (ASICs) and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In an exemplary embodiment, an exemplary 3D rendering method may use a swift actuating mechanism to overcome the limitations of traditional linear actuators. The exemplary actuating mechanism overcomes the issue of portability with low power ratings and comparatively high-resolution output.

This exemplary tactile display system may render 3D content of any CAD image physically. CAD design may first be designed in any CAD crafting software and then the design may be quantized into height scale relating to the points of CAD image. Height information carried out by the quantization of CAD image may be sent to actuators guided by custom-designed planetary motors arranged in a matrix. Each linear actuator's lead screw carrying a square pin may be adjusted to a quantized height to form the physical 3D model. Accordingly, in an exemplary embodiment, the physical form of any shape or CAD design may be created by a matrix of ABS square pins that are covered by a casing. By using these points, a threshold may be set based on these points which are then provided to respective actuators to lift a certain level to create the 3D topological structure.

In an exemplary embodiment, the linear actuator which aids in creating the Physical CAD model comprises of a lead screw guided by a planetary motor via a coupler. The threshold set by the distributing levels may be provided to the motor which allows the motor to rotate to a certain instant, the motor by its rotation may cause a lead screw to rotate and thus create a linear motion which may causes the plastic stoke to be upheld on the lead screw to move up and down as per the direction of the motor.

In an exemplary embodiment, precision of the formed physical model from the quantized distributed points may be confirmed by using the Kinect sensor (a depth-sensing camera) to check whether the model formed by the actuated pins is properly actuated or not. The depth of actuated physical 3D surface may be compared with the thresholds; if the depth values are less or greater than the threshold, the specific actuators may be actuated again to its desired threshold to accurately form the CAD model as per the CAD crafting design.

FIG. 1 illustrates an optimal tactile display, consistent with one or more exemplary embodiments of the present disclosure. In detail, optimal tactile display 100 may comprise of architectural square pins 1 which may extend by a casing 2. Pins 1 are illustrated as being square, but in an exemplary embodiment, the shape of pins 1 may be circular, triangular or any other shape as per the design construction model. These pins are extended as per the construction design. The actuated surface topology may be verified utilizing the Ms Kinect sensor 3 in order to better interpret the construction design. The sensor may be mounted above a tabletop surface with an extendable rod stand 4. A rod associated with MS Kinect sensor 3 may be extended to adjust the MS Kinect sensor 3 over the lifted 3D model. Moreover, the system also has the overhead projector 5 with an extendable rod. This rod 6 may also be extendable to adjust the visual aid of the construction design with the rendered 3D structure. The whole system components are covered with a casing. The casing of the system is designed is a way that one head 7 of the casing 2 may be opened to interpret and troubleshoot the internal components. In order to give assistance in the opening two holes 8 are provided at the bottom of the opening head 7 of the casing 2.

Figure 2A:
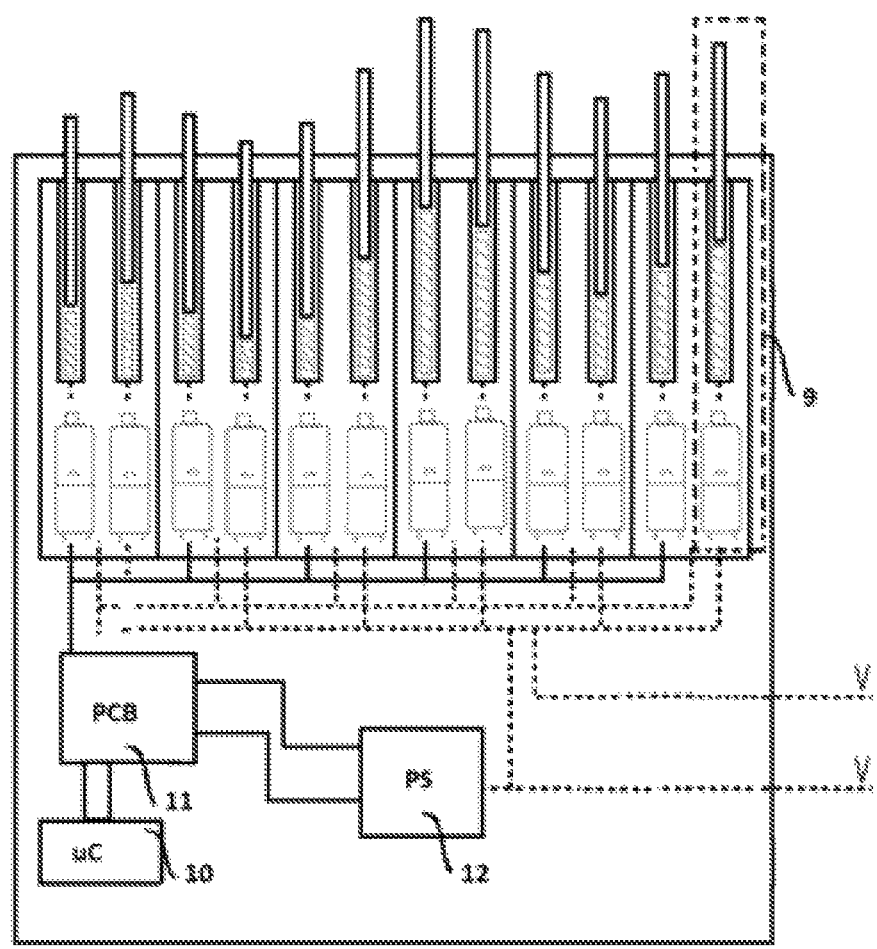
FIG. 2A shows an inside of an optimal tactile, display comprising an array of controlled pins, consistent with one or more exemplary embodiments of the present disclosure.

FIG. 2A shows an inside of an optimal tactile display comprising an array of controlled pins, consistent with one or more exemplary embodiments of the present disclosure. In detail, each pin may be individually actuated by a custom design linear actuator 9. The system control unit comprises of a microcontroller (uC) 10 which may be coupled with a custom design printed circuit board (PCB) 11 to monitor the actuation of 3D topology. In an exemplary embodiment, PCB 11 may be a control printed circuit which drives the power from the power supply unit and distributes it among any motors. The system power may be driven by a power supply 12 to operate the system. In an exemplary embodiment, power supply 12 may have ratings of 3V/40 A, 5V/40 A 3.3V/50 A, 5V/40 A, and 5V/30 A.

FIG. 2B shows a linear actuator, consistent with one or more exemplary embodiments in the present disclosure. In detail, linear actuator 9 contains planetary dc motor 13. In an exemplary embodiment, motor 13 may be of 6 mm. In an exemplary embodiment, motor 13 may be of 4 mm or 3.4 mm. In an exemplary embodiment, the smaller the diameter of the motor, the smaller will be the size of the pins which eventually offers a better resolution of 3D lifted surface topology. Over dc motor 13, a custom designed gearbox 14 is screwed 15. The gearbox 15 may be designed in a way that it offers a tradeoff between the torque and speed at rated load. The length of a gearbox 15 may be 14.5 mm. The length may depend upon the gear ratio. The larger the gear ratio, the larger will be the length of the gearbox 14.

In an exemplary embodiment, lead screw 16 may have a pitch of 3 mm. This diameter is reduced when dealing with the motor having the diameter of 4 mm and 3.4 mm. This lead screw 16 may serve as a linkage to translate the rotatory motion in to linear. The thread spacing between the lead screw 16 plays a vital role in the actuation of pins. The larger the thread pitch, the less the time it takes to actuate. In addition, the lead screw 16 at the bottom contains a circular cross-sectional hole 17 in which the motor shaft is placed in a way that it acts as a coupling to it. The motor shaft tied with a lead screw 16 using a nut 18 so that the rotation of motor inside the lead transfers the motion to the lead screw 16 and thus cause lead to be driven by the motor 3. In an exemplary embodiment, motor rotation in clockwise direction may transfer the motion by mechanical means to the coupled lead screw, which then translates the rotatory motion into linear movement and may cause the upheld plastic pin to actuate and form an exemplary 3D topological structure.

Furthermore, square tube 19 may act as a stoke to the linear actuator 9, the geometry of the stoke is thoroughly depend upon the anticipated 3D surface in an exemplary embodiment, an exemplary plastic pin has the thread inside corresponding to the lead screw 16, and rotation of the lead screw 13 leads the exemplary plastic pin to move up and down inside an exemplary hollow tube 21.

As discussed previously, the geometrical shape in illustrated exemplary embodiments is square but the shape of the stoke may depend upon the architectural elevation of the construction design which is to be rendered. The shape of the stoke may be circular, triangular or any other shape with similar housing shape of a hollow tube 21 in which the stoke 19 is placed. Moreover, the square tube is drilled entirely in circular cross-section with the diameter same as of lead screw then this drill cross-section is mapped with the threads 20 same as the lead screw so that the lead screw may rotate inside it and thus transfer the motion to the stoke 19. In an exemplary embodiment, stoke 19 may be a plastic pin inside of hollow tube 21 which moves up and down to render an exemplary construction model. The length of the square tube depends upon nominal linear travel required to lift the required 3D surface. In this exemplary system, each abs plastic pin behaves as a stoke 19, which is restricted to 6 inches. However, the length of the planetary stoke 19 may be increased as far as the center of gravity is restrained.

In an exemplary embodiment, a hollow square tube 21 the shape of this hollow tube 21 may be circular, triangular or of a different type, the shape of the tube may depend on the shape of the stoke and the desired surface topology. In an exemplary embodiment, the hollow square tube 21 may have a wall thickness of 0.5 mm such that the smaller the wall thickness, the smaller will be the spacing between the monitored pins. The length of the hollow tube 21 may depend upon the size of the motor, lead screw, and the lift required to render the construction model (stoke). Inside a hollow square tube 21, a ball bearing 22 may be tied in a manner that the wall of the hollow square tube 21 perfectly holds the ball bearing 22 at the position just after the point, where lead screw is coupled with the motor. The ball bearing 22 may be used to reduce the effect of rotation friction of the lead screw. All the counterparts including motor may be placed inside of this hollow square tube 21 as it also performs a function of the base to hold the parts of the linear actuator 9. The transformation of the rotatory motion into linear is performed as the monitored rotation of the motor may cause the lead screw to rotate inside the square tube which lets the stoke 19 to move up or down as per the direction of the motor.

FIG. 2C illustrates and exemplary linear actuator 9, consistent with one or more exemplary embodiments of the present disclosure. In an exemplary embodiment, there may be a thread pitch of around 3 mm 23 but since it depends upon the time required to render the 3D surface so, in order to achieve the real-time actuation, the thread spacing may be reduced to less than 2 threads per inch. The lead screw used in this system has male threads such that the helix of the thread is twisted in both of the directions and the orientation of the thread is in right-hand thread assembly. The lead screw 13 with left-hand assembly can also be used to obtain the desired operation when possessing the left-hand screw attributes. The cross-sectional form of a thread is trapezoidal in this system but it can be triangular, square or other shapes based on the desired metric or thread form used in the actuation assembly In an exemplary embodiment of the linear actuator 9 as shown in FIG. 2D, all the hollow tubes are arranged in a grid 24 such that all the counterparts 25 are placed inside the hollow tube to perform the actuation mechanism.

Figure 3:
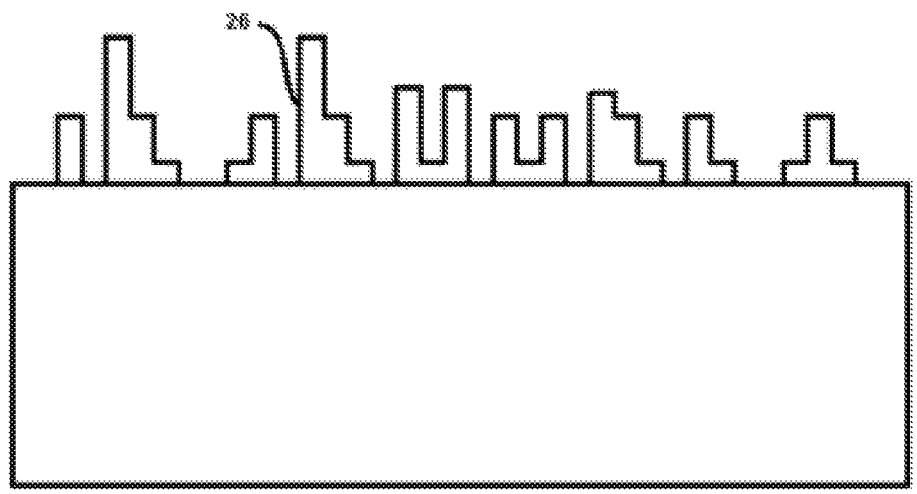

FIG. 3 displays an exemplary scenario of actuation of the pins, consistent with exemplary embodiment of the present disclosure. Specifically, as an exemplary crafted 3D designs whose height value correspondents is fed into the actuators 9 to form the physical model 26 of the country site. In the exemplary embodiment of the invention the display illustrates wireframe view of the buildings, which helps the urban planners to better interpret and plan the city infrastructure.

Figure 4:
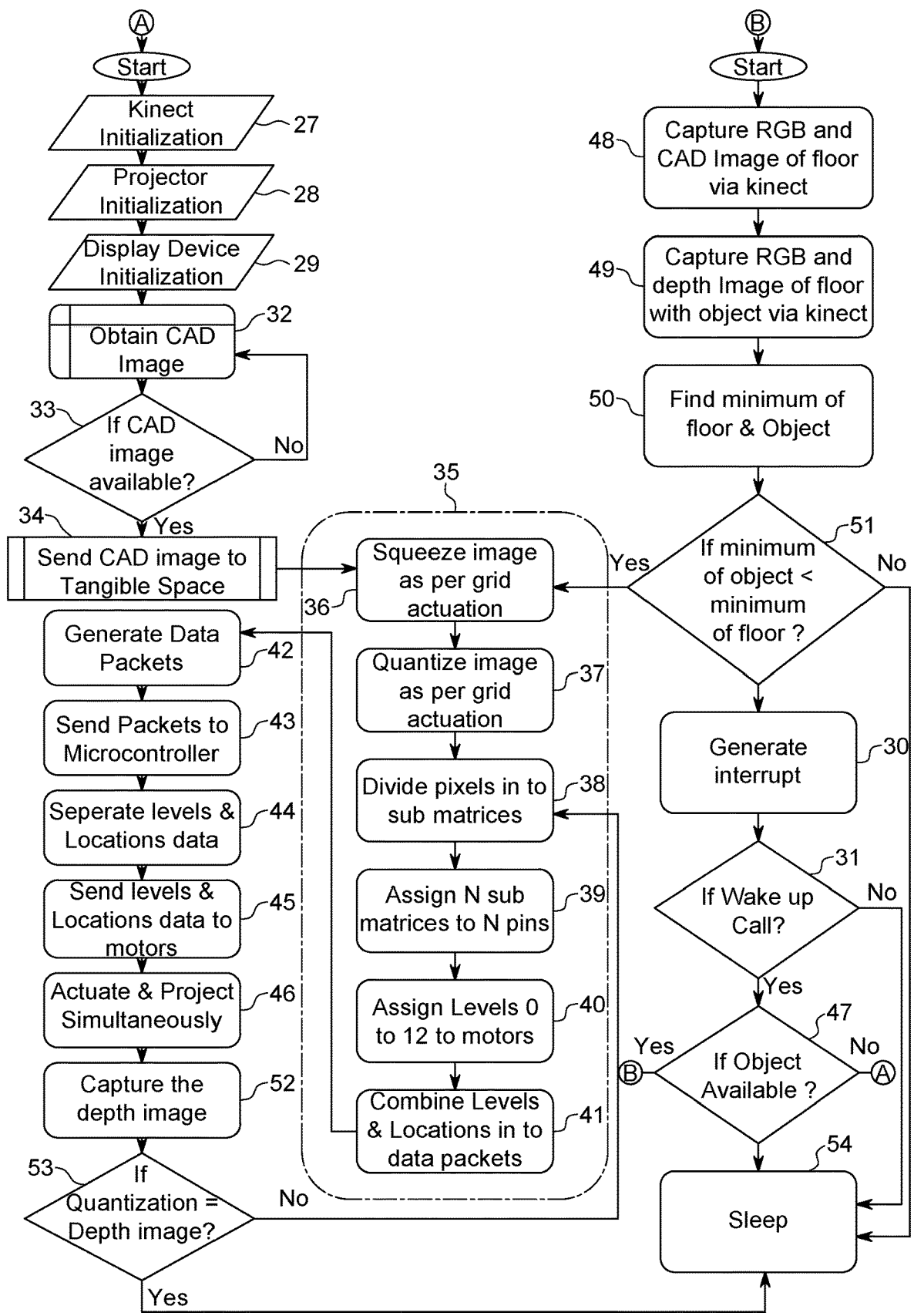
FIG. 4 illustrates an exemplary process for an optimal tactile display consistent with an exemplary embodiment of the present disclosure

FIG. 4 illustrates an exemplary process for an optimal tactile display consistent with an exemplary embodiment of the present disclosure. In an exemplary embodiment, pins may be actuated according to the 3D printed model displayed in front of Kinect.

In an exemplary embodiment, a system may receive an interrupt from a user (Step 30) and it functions as a wakeup call (Step 31) by one of two means 1) externally connected computer 2) by MS Kinect. In a first scenario, where Kinect has been initialized in Step 27, Projector has been initialized in Step 28, and display device has been initialized in Step 29, with receiving an external computer wakeup call, the system may assert a request to the internal memory in order to obtain CAD image in Step 32. If the CAD image is available 33 then that CAD image 32 will be sent to tangible space based on Step 34. An exemplary partial flowchart 35 a may perform image analytics. In the tangible space, the image may be squeezed in Step 36 so that it absolutely fits the surface topology, the CAD image be quantized (Step 37) as per the actuating grid. In an exemplary embodiment, image pixels may be divided using pixel division (Step 38) in terms of rows and columns. Soon after these rows and columns are formulated into matrices, where N submatrices may be assigned to N pins (Step 39). The N matrices may hold data of locations and levels of exemplary motors where the location may be obtained through image analytics. During analytics quantized image reflect the image area assigned to any pin based on that area the location is assigned to each pin of the 3D topological surface. Later on, the quantized CAD image is assigned levels (Step 40) by taking the average of the image heights values on the quantization scale based on the levels preset by the user; the thresholds may be given to motors. Following that both level and location bytes may be combined into a data packet (Step 41) and the system exits from the tangible space and enters into the main execution where it may generate the data packets (Step 42) holding the levels and locations data. Subsequently, the data packets may be sent to a microcontroller (Step 43) which then may separate levels and locations data (Step 44) then according to that data, may send signals to the motors 45. These signals then may cause the rendering of a 3D topological surface and project an RGB image on it simultaneously (Step 46). If the system receives the wakeup call from a Kinect sensor which shows an object is placed in front of the Kinect (Step 47); the system already has the RGB and depth image captured via Kinect of floor without an object in Step 48. Likewise, the Kinect sensor captures the RGB and depth image of the floor with object (Step 49) then the system may find the minimum depth of the floor with the object and relate with the already captured depth image of the floor without object (Step 50). If the minimum of the object depth image is less than the minimum of floor image (Step 51), the image may sent to the tangible space and subsequently follows similar steps to render the surface topology as per the object. In order to verify the actuated surface topology, Kinect sensor may capture the depth image (Step 52) of the rendered 3D surface and compares it with the quantized image (Step 53). If the quantization is equal to depth image the system will go to sleep (Step 54) otherwise it will again return to pixel division algorithm and follow the steps accordingly for accurate actuation.

Figure 5A:
FIGS. 5A-B illustrate Image processing techniques involved in image quantification, consistent with one or more exemplary embodiments of the present disclosure.
Figure 5B:
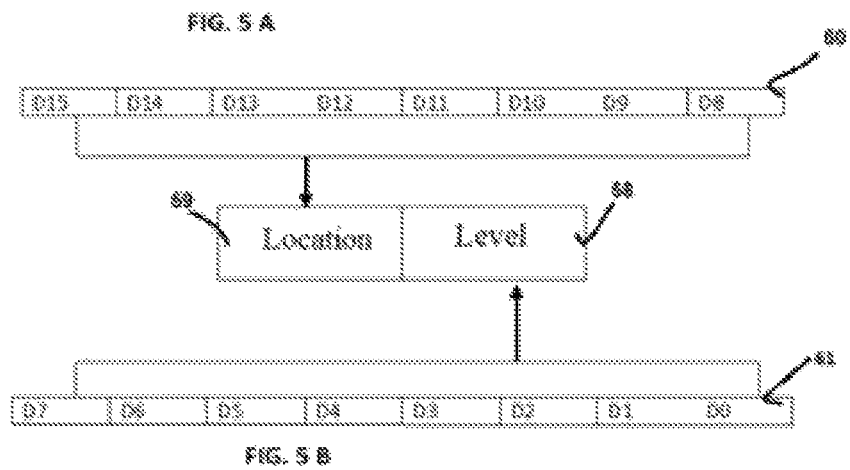

FIGS. 5A-B illustrate Image processing techniques involved in image quantification consistent with one or more exemplary embodiments of the present disclosure. In detail, exemplary image scaling steps are taken into account in which the 480×640 image 43 is downscaled to 10×10 matrix 44 (the downscaling is based on the actuating grid) to get information useful in the formation of this data packet and thus obtain the lift of desired level 45 to obtain the construction design. In a functional embodiment of the system wherein, the level and location information of the pins are combined in a single packet of string data type. This packet is then sent to the microcontroller. When that packet is received by the microcontroller 10. In an exemplary embodiment, microntroller 10 may assign the separate bytes to the level and location. Evermore, the packet is of 16 bits as represented by D0 to D15. The Low Order Byte (LOB) (D0 to D7) 46 is reserved for level 47 information to which the motor has to be lifted whereas High Order Byte (HOB) (D8 TO D15) 48 is reserved for the motor 49 information that which Motor is to be actuated. It describes the relationship between the assigned levels and the lift, it will provide in inches to actuate the motor. The motor 49 may be allowed to run for a certain period of time in a clockwise direction so that it can attain the required height. In an exemplary embodiment, only 12 levels for the heights/lifts for motors hence are utilized only 4 bits (D0-D3) have been utilized from Level information byte of the data packet.

In an exemplary embodiment, in the exemplary square array, 100 square pins are illustrated but the exemplary method may be implemented utilizing a different number of pins. The square array size may be increased or decreased as per the design model requirements. In this embodiment, the device is based on an array of controlled pins which is extended by a plastic casing to acquire 3D CAD shapes. Each controlled pin in a square matrix is individually controlled by a custom-designed linear actuator. The linear actuator used in this system comprises of specially design hi-tech 6 mm planetary motor upheld with a lead screw via a coupler. Over this lead screw, a 6 m abs square bar having thread inside is mounted in such a manner so that the screw rotates inside it. In order to efficiently create a linear motion, the 6 mm thread rod is put inside a 7 mm square tube so that the threaded rod acts like stoke 19 to it. To overcome the effect of friction a ball bearing is used to provide a swift linear actuation.

In an exemplary embodiment, the exemplary physical display provides a new class of visualization that dynamically renders physical shapes and geometry. The formed shape may react to the user input or consecutively changes its attributes based on the shape formed using CAD software. With the help of this dynamic shape display system urban planners, architects and builders may be able to develop and view 3D models and designs over dynamic displays to better understand and share their designs. In addition, they will be able to make changes according to their requirements and rectify errors in design before 3D printing.

This exemplary optimal tactile display is a dynamic display by virtue of which one may render the physical content of digital data. In this system, the focus is on the use of tactile display to design 3D shape that can be visualized by the naked eye and touched physically. However, this tactile display may be used by the designers around the globe to optimally visualize their 3D models. It can also help students by providing a tactile Braille to blind and help other students to better understand volumetric data.

The embodiment of this device consists of a 10×10 grid based on an array of controlled square pins. Each pin can individually move in an upward or downward direction using the linear actuators. Although the actuation mechanism comprises of 6 mm planetary gear motor coupled with the lead screw upon which an abs square tube is mounted, the motor rotation tends to lift the pin up or down in regard of the digital data perceived at the pin. The control mechanism is governed by the microcontroller and the custom designed PCB. Moreover, Kinect is mounted 1.2 m above the surface provides the depth of the pins to verify whether the shape model on a topological surface is perfectly formed or not. In order to verify all height map; the depth of the formed surface topology is compared with the depth of the quantized CAD image. If there is any mismatch in the depth it causes the feedback signal to the particular actuators to reactuate to their desired height.

In an exemplary embodiment, the grid of the architectural pins which serves as an actuated section of the physical surface topology. This physical surface comprises of the array of square pins. Each pin in the grid has individually driven a custom-designed linear actuator. The designer may model the construction design by feeding the correspondent values of densely distributed point of the height to the relevant actuator to obtain the desired 3D surface.

In an exemplary embodiment, a user first designs any construction site or model using a CAD crafting software, then forming a grid similar to that of the pin array to align the model design to the actuated grid surface after that the image is quantized to the height scale; the height scale is predefined by user. In predefinition of the height scale, the elevation of the model structure is bisected as per the set levels of actuation. Each level of actuation is assigned a value which is then fed into the actuators to render the model structure.

All the quantization of height calculations of the crafted CAD image may be done in externally connected laptop or computer. Through the actuation of the pins, the shape is formed and that shape may be a 3D model which may be loaded from the CAD image from the computer and the projector mounted above the surface provides additional Red Green Blue colours to the 3D shape formed at the output of the optimal shape display.

To form the shape display using a CAD design, the image crafted on the CAD design may first quantized on the height scale than the image is squeezed in such a manner so that it perfectly fits with the actuating grid. The image may be squeezed by caring out the average height values of the distant areas of the CAD image then these average values are assigned thresholds which represent the levels to which the square pins are actuated to form the CAD model on the surface topology. The level is the linear displacement covered by polystyrene pin when pulled by a gear motor. In an exemplary embodiment, there are 12 levels of actuation. 12 levels of actuation i-e level0 to level12 being Level 0 represents no actuation while other subsequent levels are obtained with the increment of 0.5 inches like Level 1 represents 0.5-inch, Level 2 represents 1 inch and so on as given in Table 1.

TABLE 1

| Different levels of actuation | |
|---|---|
| Levels | The lifting of the pin (inches) |
| 0 | No Actuation |
| 1 | 0.5 |
| 2 | 1 |
| 3 | 1.5 |
| 4 | 2 |
| 5 | 2.5 |
| 6 | 3 |
| 7 | 3.5 |
| 8 | 4 |
| 9 | 4.5 |
| 10 | 5 |
| 11 | 5.5 |
| 12 | 6 |

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed:

1. A method for displaying an optimal tactile display, comprising:
   obtaining a computer-aided design and drafting (CAD) image;
   transforming the CAD image into physical dimensions;
   creating an optimal tactile display reflective of the physical dimensions utilizing instructions from one or more microcontrollers, wherein the optimal tactile display comprises:
   an array display surface comprising a collection of controlled pins, a quantity of controlled pins propositional to a size of the physical dimensions, wherein each pin assembly of the controlled pins configured to be extended pins based upon the size of the physical dimensions;
   a plurality of planetary motors, each of the planetary motors associated with the controlled pins and configured to move the plurality of pins;
   a control unit to monitor the extension of the plurality of pins;
   respective linear actuators configured to drive a respective motor shaft connected to a respective lead screw, each respective lead screw placed inside of each of respective threaded circular cross-section stoke tube.

2. The method of claim 1, further comprising:
   verifying accuracy of a physical design utilizing a sensor comprising comparing a height of lifted topology with the the physical dimensions;
   quantized CAD image.

3. The method of claim 2, further comprising:
   adjusting the plurality of pins responsive to determining that the physical design is inaccurate based on the comparison verifying accuracy of a physical design utilizing a sensor comprising comparing a height of lifted topology with the physical dimensions height of lifted topology with the of the physical dimensions;

quantized CAD image.

4. The method of claim 1, wherein a diameter of the respective linear actuators is one of 3.4, 4, and 6 mm.

5. The method of claim 1, wherein transforming the CAD image into physical dimensions comprises:
crafting a CAD image of a construction design in CAD crafting software forming a grid to squeezing that image to an actuating matrix;
forming a grid similar to that of the pin array to align the model design to the actuated grid surface after that the image is quantized to the height scale, wherein the height scale is predefined by the user;
Bisecting the height scale the elevation of the model structure as per the set levels of actuation, wherein each level of actuation is assigned a value which is then fed into the actuators to render the model structure; the model structure at the time of the actuation is mapped with a projection of a replicated CAD image to provide a visual aid.

6. The method of claim 5, further comprising responsive to changes during creating the display, adjusting actuation of the stoke pins.

7. The method of claim 5, wherein the actuation and projector mapping occur simultaneously.

8. The method of claim 3, wherein the dynamic interpretation of projection mapping cause windows opening and closing of the construction model.

9. The method of claim 5, wherein the physical model of the entire cities can be actuated on the upper surface.

10. The method of claim 5, wherein the internal structures of the buildings are also rendered with the shape display.

11. The method of claim 5, wherein the same colours of CAD, the image is mapped on the lifted 3D model.

* * * * *